(12) United States Patent
Wu et al.

(10) Patent No.: US 10,533,743 B2
(45) Date of Patent: Jan. 14, 2020

(54) THERMOCHEMICAL REGENERATION WITH SOOT FORMATION

(71) Applicants: Kuang-Tsai Wu, East Amherst, NY (US); Hisashi Kobayashi, Bedford, NY (US)

(72) Inventors: Kuang-Tsai Wu, East Amherst, NY (US); Hisashi Kobayashi, Bedford, NY (US)

(73) Assignee: Praxair Technology, Inc., Danbury, CT (US)

(*) Notice: Subject to any disclaimer, the term of this patent is extended or adjusted under 35 U.S.C. 154(b) by 458 days.

(21) Appl. No.: 15/183,879

(22) Filed: Jun. 16, 2016

(65) Prior Publication Data

US 2016/0370005 A1  Dec. 22, 2016

Related U.S. Application Data

(60) Provisional application No. 62/181,528, filed on Jun. 18, 2015.

(51) Int. Cl.
  *F23L 7/00*  (2006.01)
  *B01J 7/02*  (2006.01)
  (Continued)

(52) U.S. Cl.
  CPC .............. *F23L 7/007* (2013.01); *B01J 7/02* (2013.01); *B01J 19/0046* (2013.01); *C01B 3/34* (2013.01); *C10J 3/82* (2013.01); *C10L 3/00* (2013.01); *F23B 5/02* (2013.01); *F23B 70/00* (2013.01); *F23J 15/00* (2013.01); *B01J 2219/00054* (2013.01); *B01J 2219/00756* (2013.01); *C01B 2203/0216* (2013.01); *C01B 2203/0222* (2013.01); *C01B 2203/06* (2013.01); *C01B 2203/0827* (2013.01); *C01B 2203/0883* (2013.01); *C01B 2203/1235* (2013.01); *C01B 2203/141* (2013.01); *C01B 2203/84* (2013.01); *C10J 2300/165* (2013.01); *C10J 2300/1618* (2013.01); *C10J 2300/1634* (2013.01);
  (Continued)

(58) Field of Classification Search
  None
  See application file for complete search history.

(56) References Cited

U.S. PATENT DOCUMENTS 4,347,072 A * 8/1982 Nagaoka ............... C03B 5/235
                                                        65/134.6
5,057,133 A    10/1991 Chen et al.
(Continued)

FOREIGN PATENT DOCUMENTS

FR          3007829          1/2015

OTHER PUBLICATIONS

A.Gonzalez et al., Optimelt (TM) Regenerative Thermo-Chemical Heat Recovery for Oxy-Fuel Glass Furnaces, 75th Conference on Glass Problems, Apr. 8, 2015, pp. 113-120, John Wiley & Sons, Inc., Hoboken, NJ, USA, XP55285013.

*Primary Examiner* — Avinash A Savani
*Assistant Examiner* — Martha M Becton
(74) *Attorney, Agent, or Firm* — Donald T. Black (57) ABSTRACT

Operation of a thermochemical regenerator to generate soot or to increase the amount of soot generated improves the performance of a furnace with which the thermochemical regenerator is operated.

6 Claims, 3 Drawing Sheets

(51) Int. Cl.
*B01J 19/00* (2006.01)
*C01B 3/34* (2006.01)
*C10J 3/82* (2006.01)
*C10L 3/00* (2006.01)
*F23B 30/00* (2006.01)
*F23B 70/00* (2006.01)
*F23J 15/00* (2006.01)

(52) U.S. Cl.
CPC .......... *C10J 2300/1884* (2013.01); *C10L 2200/0277* (2013.01); *C10L 2200/0281* (2013.01); *C10L 2200/0286* (2013.01); *C10L 2200/0407* (2013.01); *C10L 2290/02* (2013.01); *C10L 2290/04* (2013.01); *C10L 2290/06* (2013.01)

(56) References Cited

U.S. PATENT DOCUMENTS

| | | | | |
|---|---|---|---|---|
| 5,139,755 A | * | 8/1992 | Seeker | B01D 53/56 |
| | | | | 423/235 |
| 5,759,022 A | * | 6/1998 | Koppang | C03B 5/235 |
| | | | | 110/345 |
| 5,851,256 A | * | 12/1998 | Quirk | B01D 53/56 |
| | | | | 65/134.6 |
| 5,993,203 A | * | 11/1999 | Koppang | C03B 5/235 |
| | | | | 432/179 |
| 6,113,874 A | | 9/2000 | Kobayashi | |
| 6,210,157 B1 | | 4/2001 | Kobayashi | |
| 6,488,076 B1 | * | 12/2002 | Yasuda | F23G 7/065 |
| | | | | 165/10 |
| 2006/0150677 A1 | | 7/2006 | Kobayashi | |
| 2014/0367614 A1 | | 12/2014 | Damstedt et al. | |
| 2016/0305656 A1 | * | 10/2016 | Wu | C01B 3/32 |
| 2017/0121206 A1 | * | 5/2017 | Kobayashi | C03B 3/023 |
| 2018/0118600 A1 | * | 5/2018 | Francis, Jr. | C03B 5/235 |

* cited by examiner

FIG. 3 ically in two or more checker-filled regenerators. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher $H_2O$ and $CO_2$ concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another (second) regenerator and mixed with a stream of fuel (referred to herein as Reforming Fuel or RF). In the following description, pure methane ($CH_4$) is described as reforming fuel for purposes of illustration.

THERMOCHEMICAL REGENERATION WITH SOOT FORMATION

RELATED APPLICATION

This application claims the benefit of U.S. Provisional Application Ser. No. 62/181,528, filed on Jun. 18, 2015, which is incorporated herein by reference.

FIELD OF THE INVENTION

The present invention relates to combustion in furnaces such as glassmelting furnaces wherein material is fed into the furnace and is heated and/or melted by the heat of combustion that occurs within the furnace.

BACKGROUND OF THE INVENTION

U.S. Pat. No. 6,113,874 discloses heat recovery methods useful with furnaces employing regenerators wherein a stream of combustion products formed in the furnace is passed through a first regenerator to heat the first regenerator and cool the combustion products, and then a portion of the cooled combustion products is combined with fuel to form a mixture which is passed through a second heated regenerator and where it undergoes an endothermic reaction to form syngas that then passes into the furnace and is combusted.

The present invention is an improvement in the methods disclosed in that patent, whereby it has unexpectedly been found that the efficient heat recovery afforded by these methods can be improved and other benefits described herein can be realized. In particular, the present invention encourages the formation of significant amounts of soot at certain stages, whereas the aforementioned U.S. Pat. No. 6,113,874 teaches that soot is something to be minimized and, if produced, to be removed.

BRIEF SUMMARY OF THE INVENTION

One aspect of the present invention is a method of carrying out combustion in a furnace, comprising
(A) combusting fuel in a furnace to produce gaseous combustion products, and
(B) alternately (1) (i) passing gaseous combustion products from the furnace into and through a cooled first regenerator to heat the first regenerator and cool said gaseous combustion products,
(ii) passing at least a portion of said cooled portion of gaseous combustion products from said first regenerator, and hydrocarbon fuel, into a heated second regenerator,
(iii) reacting the gaseous combustion products and the fuel in the second regenerator in an endothermic reaction under conditions effective to form syngas comprising hydrogen and carbon monoxide and to form soot which is entrained in the syngas, and thereby cooling the second regenerator; and
(iv) passing said syngas and entrained soot from said second regenerator into said furnace and combusting the syngas in the furnace with one or more oxidant streams injected into said furnace; and
(2) (i) passing a portion of the gaseous combustion products from the furnace into and through a cooled second regenerator to heat the second regenerator and cool said portion of the gaseous combustion products,
(ii) passing at least a portion of said cooled portion of gaseous combustion products from said second regenerator, and hydrocarbon fuel, into a heated first regenerator,
(iii) reacting the gaseous combustion products and the fuel in the first regenerator in an endothermic reaction under conditions effective to form syngas comprising hydrogen and carbon monoxide and to form soot which is entrained in the syngas, and thereby cooling the first regenerator, and
(iv) passing said syngas and entrained soot from said first regenerator into said furnace and combusting the syngas in the furnace with one or more oxidant streams injected into said furnace.

Another aspect of the present invention is a method of carrying out combustion in a furnace, comprising
(A) combusting fuel in a furnace to produce gaseous combustion products,
(B) passing at least a portion of the gaseous combustion products from the furnace, and hydrocarbon fuel, into a duct,
(C) reacting the gaseous combustion products and the fuel in the duct in an endothermic reaction under conditions effective to form syngas comprising hydrogen and carbon monoxide and to form soot which is entrained in the syngas, and
(D) passing said syngas and entrained soot from said duct into said furnace and combusting the syngas in the furnace with one or more oxidant streams injected into said furnace.

As used herein, "soot" is carbon-containing particulate matter. Soot may exhibit a wide range of morphological characteristics including size, shape, surface structure, and chemical compositions. For example, soot particles can be porous and contain 0.5% to 2% of hydrogen with the majority of the rest as carbonaceous materials. The size of a soot particulate can range from 50 to 650 angstroms (Å); however, if soot particles agglomerate, then the final soot masses can be in filament form and reach as long as 3000 Å.

DETAILED DESCRIPTION OF THE INVENTION

The invention is described herein in particular detail with respect to a preferred type of furnace, namely one that employs a heat recovery process which recaptures usable heat from high temperature flue gas exhaust streams. This heat recovery process proceeds in two cycles, which are referred to herein as the flue cycle and the reforming cycle. These two cycles are performed alternat Other satisfactory fuels include any combustible gas, gas mixture, or vaporized liquid fuels including, but not limited to, natural gas, propane, and LPG (liquefied petroleum gas).

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RFG/RF mixture passes through the second regenerator, it reaches a temperature at which reforming reactions begin to occur and continue to occur, producing products including $H_2$ and CO. The reforming reactions are endothermic and the heat needed to promote the reforming reactions is absorbed from the heated checker. The reforming reactions produce a mixture of soot entrained in a gaseous composition, which typically comprises one or more components such as such as $H_2$, CO, and unreacted gases comprising $H_2O$, $CO_2$ and $CH_4$. The gaseous composition thus produced may also be called "syngas" herein. The mixture of gaseous products and soot emerges from the second regenerator into the furnace wherein the combustible gaseous components are combusted with oxidant to provide thermal energy for heating and/or melting material in the furnace. This combustion may combust and gasify a portion of the soot inside a flame boundary, but eventually all of the soot in the syngas is either oxidized directly by excess $O_2$ in furnace flue gas to $CO_2$ and $H_2O$, or gasified to CO and $H_2$ firstly by $H_2O$ and $CO_2$ in the furnace flue. CO and $H_2$ gases produced by the soot gasification are further oxidized to $CO_2$ and $H_2O$ by excess $O_2$ in the furnace. Therefore, the gaseous combustion products (flue gas) produced in the furnace and discharged from the furnace such as in a duct for additional heat recovery contain little or, preferably, no soot. This combustion process, where most or all of the soot in the syngas is continuously burned and gasified within a flame boundary, produces a luminous flame having superior heat transfer characteristics and benefits, as described more fully below.

For a typical cruciform checker with a square gas passage of 15 cm by 15 cm size, the syngas mixture produced by the endothermic reactions preferably contains 0.1 to 20 grams of soot per cubic meter of the mixture (g/m³), more preferably at least 1.0 g/m³ of soot, and yet more preferably 1.0 to 10 g/m³ of soot. Larger checker gas passages require less soot and conversely smaller gas passages require more soot for the same heat transfer benefit.

To promote formation of the desired amounts of soot in the mixture that is produced by the endothermic reforming reactions, the syngas temperature exiting from the regenerator in which the endothermic reactions occur, should preferably be at a temperature of at least 1000 F, and the residence time therein should be at least 0.1 seconds, up to 10 seconds. Formation of the desired amounts of soot is also promoted by operating with a low ratio of recycled flue gas to natural gas as reforming fuel, preferably at a ratio (by volume at 60 F) less than 2:1, more preferably less than 1:1, or even less than 0.5:1. Reducing the excess $O_2$ content of the furnace combustion gases will correspondingly reduce the $O_2$ concentration in the RFG, thus promoting soot formation during the endothermic reforming reactions.

After a length of time, the operation of the two regenerators is reversed, i.e., the regenerator that was used in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The operation and control of the present invention is described below in conjunction with FIGS. 1 to 3. An end-port fired glass furnace (10) fitted with two regenerators in end wall (3) is used as an example.

Figure 1:
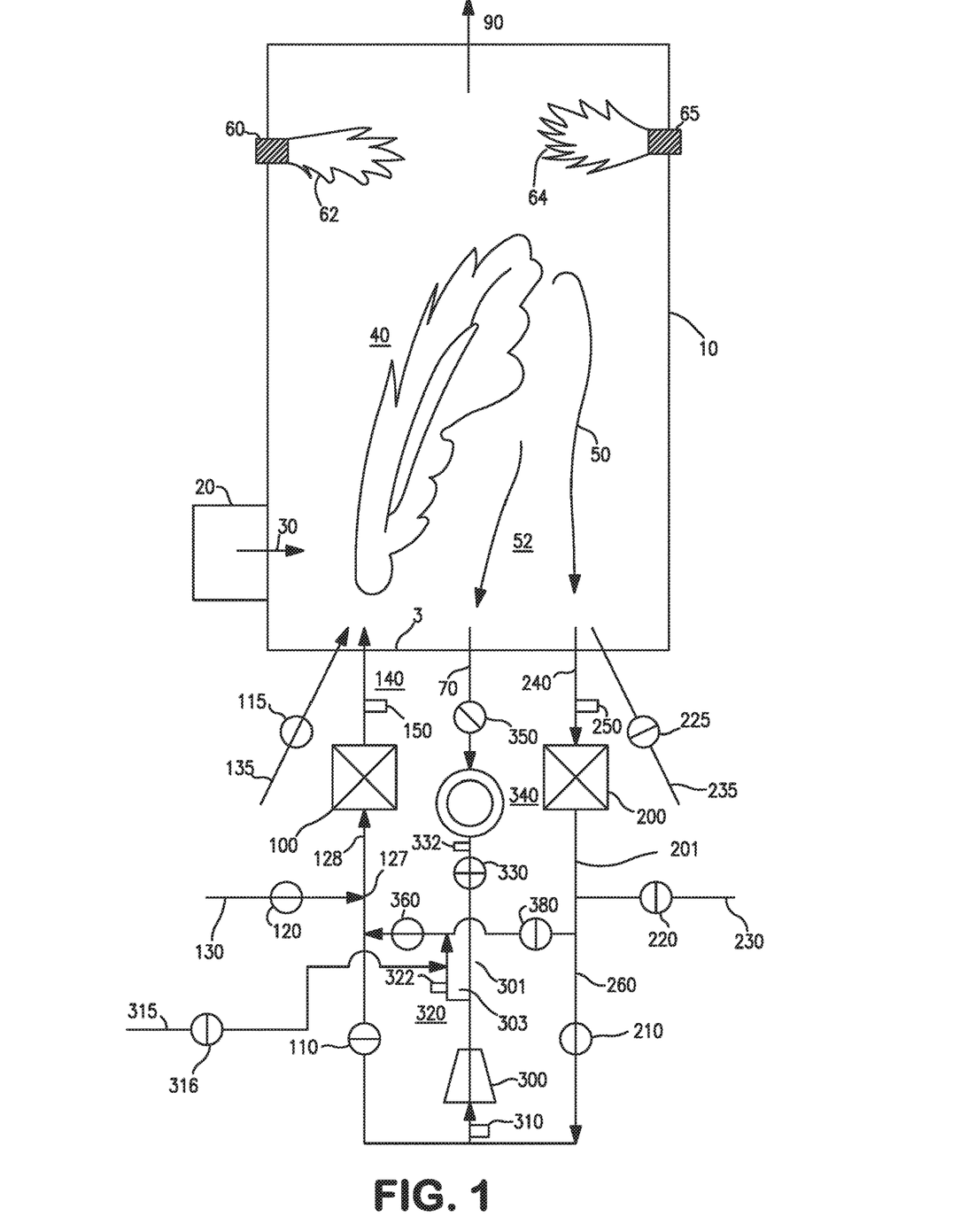
FIGS. 1-3 are schematic representations of different aspects of the present invention.

As shown in FIG. 1, end-port glass furnace (10) has a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3.

Figure 2:
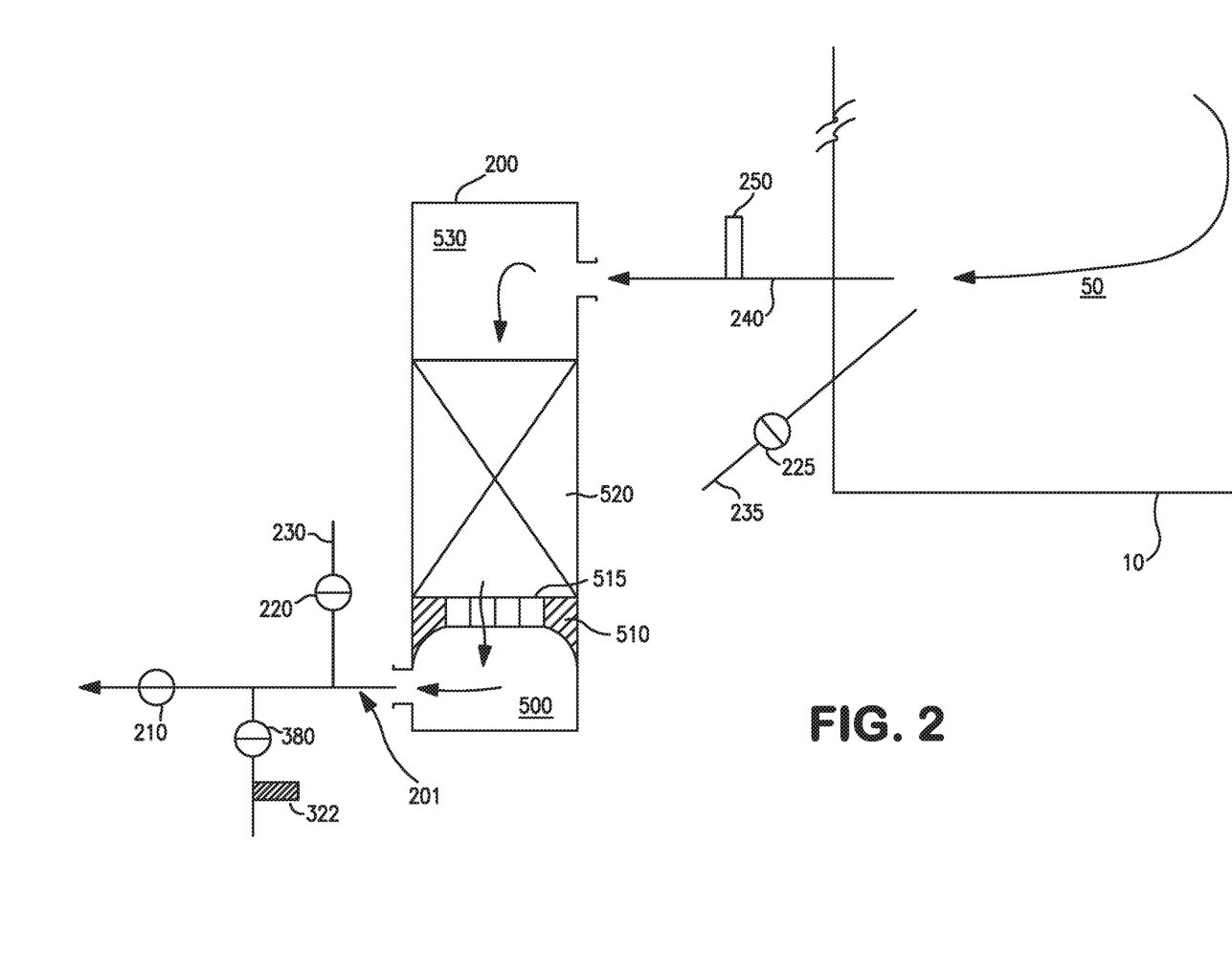

As seen in FIG. 2, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. As seen in FIG. 1, a portion (52) of the flue gases produced in furnace (10) may be by-passed to conduit (70) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 1 and 2, the cooled flue gas stream (201) exits the regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this flue gas leaves the system to exhaust as defined herein. A portion (303) of the flue gas is recycled to the bottom of regenerator (100) by passing through conduit (320) and valve (360). This is Recycled Flue Gas (RFG). Its flow is metered by a flow meter (322). Reforming fuel which is to be fed to the second regenerator (100) is supplied by a conduit (130) through valve (120).

Suitable reforming fuels include methane (which is preferred) as well as any other combustible gas, gas mixture, or vaporized liquid fuels including, but not limited to, natural gas, propane, and LPG (liquefied petroleum gas).

Figure 3:
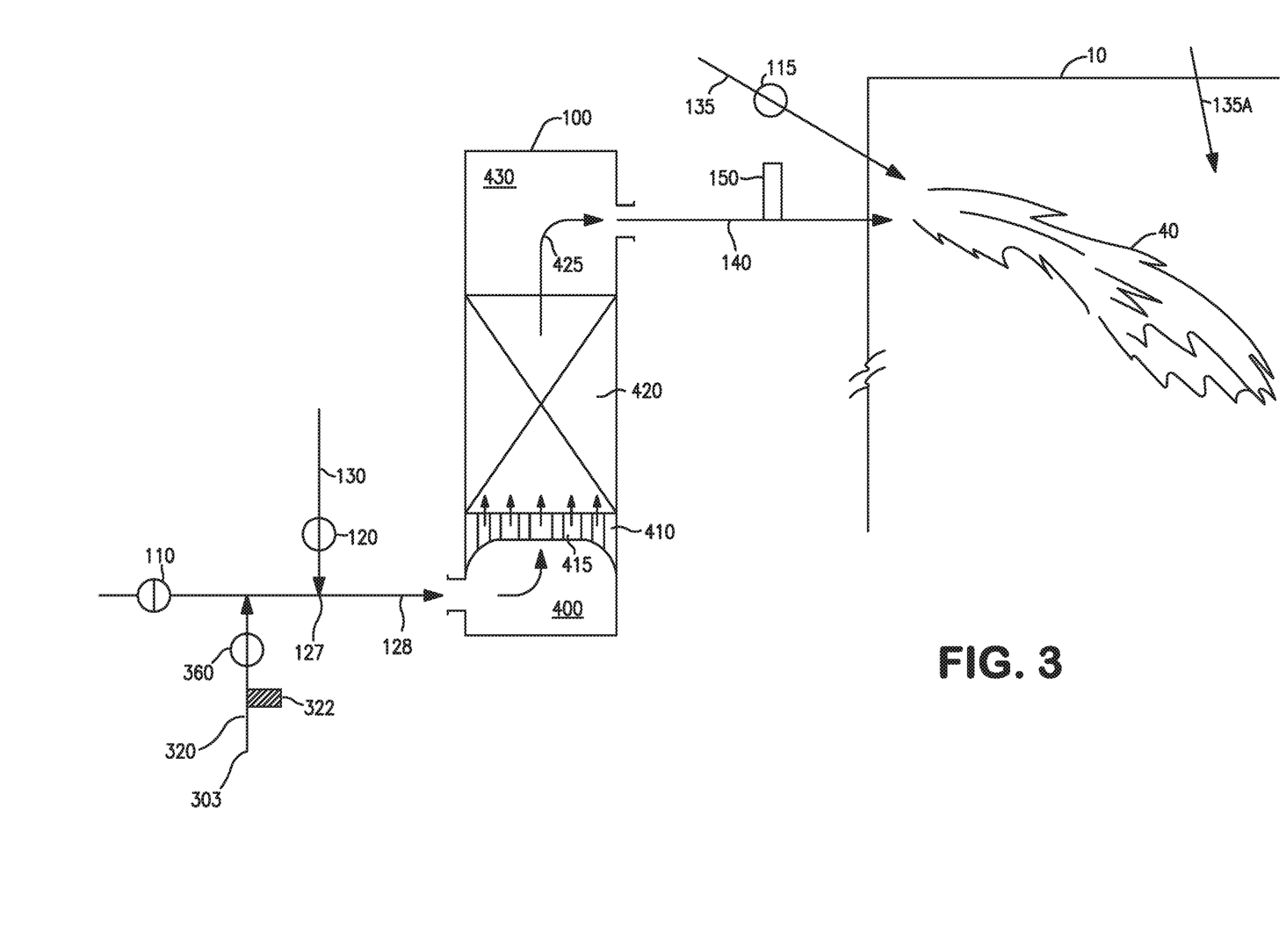

As seen in FIG. 3, the reforming fuel (RF) from stream (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF reaches reforming temperature, endothermic reforming reactions occur in which the reforming fuel (e.g. CH4) reacts with CO2 and H2O in the RFG and forms CO, H2, and soot. The required heat for the endothermic reforming and soot-forming reactions is taken from the heated checkers. The reforming reaction continues as the RFG/RF mixture continues to travel toward the top space (430). The gaseous, soot-containing stream (425) (referred to herein as a "reformed" or "syngas" gas stream) exits from the top of checker pack (420). Stream (425) has high temperature and may include species such as CO, $H_2$, soot, unreacted $CH_4$, and unreacted $CO_2$ and $H_2O$. The stream (425) passes through port neck (140) and oxygen sensor (150), and enters furnace (10). This stream exits checker pack (420) at temperatures for example ranging from 1800 F to 2500 F.

Oxidant for combustion of the syngas is supplied by a conduit (135) with an opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %.

Typically, the heat recovery process proceeds with one regenerator in the flue cycle and one regenerator in the reforming cycle, as seen in FIG. 1, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation. Before the reversal, remaining syngas in regenerator (100) is to be purged to furnace (10). In this instance, reforming fuel supplied to the regenerator is terminated at first by closing valve (120) while letting the flow of RFG from blower (300) continue. Remaining syngas in regenerator (100) is purged by the RFG for a specified amount of time so that nearly all the syngas in the regenerator is expelled to the furnace and combusted to completion.

Upon reversal, the flue gas from the furnace passes through regenerator (100), and a portion thereof passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and recycled flue gas undergoes in regenerator (200) the endothermic reforming and soot-forming reactions which had occurred in regenerator (100) in the previous cycle as described herein, to produce stream (425) of syngas and soot which passes into furnace (10) where it is combusted with oxidant (235) that is fed through valve (225).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (i.e. (100) or (200) as the case may be) is undergoing the purging sequence described above. For maximum heat recovery, it is preferred that burners (60) and (65) are not co-firing with the syngas flame (40). It is also preferred that during the purging sequence, burners (60) and (65) are not firing.

The soot content of the gas-soot stream (425) can be further enhanced by adding soot and/or by adding additional carbonaceous soot precursor material into the unit in which the endothermic reforming and soot-forming reactions occur. This is illustrated in FIG. 1, where stream (315) represents an external source of soot, which may be a stream of soot entrained in air or other suitable carrier gas, or may be a stream comprising hydrocarbons which have a high tendency to crack under the conditions of the endothermic reaction, forming additional soot. Examples of such hydrocarbons include polycyclic aromatic hydrocarbons (PAH) such as naphthalene, aromatic hydrocarbons such as benzene and toluene, and aliphatic hydrocarbons such as acetylene and ethylene. Stream (315) is fed to connect with conduit (320) such that stream (315) mixes with RFG when valve (316) is opened. The resulting mixed stream is then mixed with reforming fuel alternately from conduits (130) and (230), to form a mixture that is alternately fed into the heated regenerator (100) and (200) respectively wherein the reforming and soot-forming reactions occur as described herein.

A preferred way to inject additional soot is to inject it into the higher temperature region of the reforming regenerator (top of checker pack (420) in FIG. 3). In this region, the reforming reactions are faster due to the higher syngas temperature. If extra heat is extracted from the heated checkers due to enhanced checker to syngas radiative heat transfer by soot injection, this extra heat could promote endothermic reforming reactions to high degrees of completion such that more heat can be recovered by a fixed volume of checkers. One difficulty of doing this is soot has to be distributed into the syngas rather uniformly. The checker pack (420) may have to be divided and structured into at least two sections with a cavity in between. Soot would be injected into the cavity and mixed well with the syngas coming out of the lower checker section. This syngas/external soot mixture then flows into the second checker section and upward for further reforming with the help of the injected soot for enhanced heat transfer.

Flue gas stream (50) may contain components of glass making materials in particulate form such as limestone and dolomite ($CaCO_3$, $MgCO_3$) and volatilized alkalis such as sodium and potassium, in addition to gaseous species such as $SO_2$, $CO_2$, $O_2$, $N_2$, and $H_2O$. Fine raw materials in batch/cullet (30) can be entrained into the flue gas stream and carried over to the regenerator (200) top. Fine particulates are also formed due to decrepitation of dolomite and limestone particles upon heating. Particles of condensed matter such as alkali sulfates ($Na_2SO_4$, $K_2SO_4$) can form typically from 1150 C to 800 C gas temperature when the flue gas is cooled down in regenerator (200) which is in the flue cycle. Some of this carried-over and condensed particulate matter may deposit on regenerator walls and checkers and may be present in the cooled flue gas stream (201). Field measurement of particulate matter in flue gas streams of oxyfuel fired glass furnaces had showed concentrations ranging from 0.2 g to 1.0 g per $Nm^3$ (normal cubic meter defined at zero ° C.) of flue gas volume. The RFG stream (303) advancing towards regenerator (100) for reforming reactions also contains about the same level of particulate matters as in stream (201).

This particulate matter in RFG stream (303) will contribute to the enhancement of radiative heat transfer also between the already heated checker and the colder RFG/RF mixture in regenerator (100) during reforming. The above beneficial heat transfer effect is especially advantageous in the lower portion of checker pack (420) in regenerator (100) where the temperature of the RFG/RF mixture is lower than 1000 F and the reforming reactions are slower in speed thus less soot is produced by the reforming reactions. Thus it is preferred that the particulate matter in RFG stream is not filtered prior to passing into cooled regenerator (200).

The present invention provides numerous benefits.

It has been determined that, quite unexpectedly, this method improves the overall heat transfer rate to the reactants in the endothermic reforming and soot-forming reactions in the regenerator or other duct in which those reactions occur, even though the concentrations of gaseous species (such as $CH_4$, $CO_2$, and $H_2O$) that would be expected to participate in the thermal radiation heat transfer within the regenerator are decreasing as the endothermic reforming proceeds. As a result of the method of the present invention, the reforming reaction proceeds further and converts more of the reactants at any given set of initial conditions (i.e. temperature within the regenerator at the point when flow of the RFG/RF mixture into the regenerator begins).

In addition, the present invention provides improved flame and heat transfer characteristics within the furnace upon combustion of the mixture stream (of syngas and soot) in the furnace. When the soot-laden syngas is combusted in the furnace and forms a flame, the emissive power of the flame (i.e., total radiation energy emitted per unit surface area of flame) is increased due to the existence of the soot particles inside the flame envelope (relative to a flame upon combustion of a stream containing no soot, or containing lesser amounts of soot than what the present invention provides). This increased emissive power results in increased heat transfer to the material that is in the furnace to be heated and/or melted, by virtue of the increased radiative heat transfer.

This feature is especially advantageous in embodiments wherein the heating and/or melting of the solid material in the furnace can cause fine particles of material to be entrained into the gaseous combustion products that are formed by the combustion in the furnace. The presence of such particles in the gaseous combustion products is undesirable, as they can form deposits on surfaces of the interior of the furnace or on inner surfaces of ducts connecting to the furnace, and they can be present in the flue gas that is exhausted to the atmosphere or to other locations within the overall operation. Entrainment of fine particles of material from the solid material being heated and/or melted in the furnace can occur when the material itself contains fine particulate matter, or when particles of the material decrepitate on being heated to produce fine particles into the gaseous atmosphere over the solid product. Such results can occur, for example, when the solid material being heated and/or melted in the furnace is batch and/or cullet material that is the typical feed material in the case of a glassmelting furnace. The increased emissive power of the flame that is produced by the present invention reduces this problem in that it melts ("glazes") surfaces of the material in the furnace, and does so more quickly than would otherwise be the case. This greatly reduces the tendency of particulate material that is present to be entrained into the gaseous combustion products above the materials, and thereby reduces the availability of entrained particulate material to collect in regenerator passages (which would lead to plugging of the passages) or to escape into the atmosphere (which would cause environmental emission problems).

EXAMPLE

The effectiveness of the present invention to provide in-situ soot generation to accelerate regenerator checker to gas radiative heat transfer during the thermal-chemical heat recovery process, is illustrated in this example and in the accompanying table below (which are provided for purposes of illustration and not limitation).

Five types of flue gas compositions were selected to illustrate the effect of radiative species ($CO_2$, $H_2O$, CO, $CH_4$, and soot) on regenerator checker to gas radiation heat transfers. For Cases 1 through 5, the same assumptions were made in each case as indicated in the following: gas temperatures at 1120 C, checker temperatures at 1150 C, radiation mean-beam lengths in checkers at 0.14 m, checker surface emissivitites at 0.4, and the total pressure of the concerned heat transfer process was at 1 atm.

In Case 1, flue gas from an air-fired combustor which had 9.1% $CO_2$ and 18.2% $H_2O$ was selected as a reference case. Using available information shown in the column for Case 1 and an emissivity model developed for luminous flames (not shown), gas emissivity was calculated to be 0.092. Using another 1(sink)-1(grey gas)-1(black surface) radiative heat exchange model (not shown) as an approximation, net radiative heat flux from the checker to the flue gas was calculated as 699 w/m².

In Case 2, flue gas was from an oxy-fired combustor therefore it had higher $CO_2$ (32.9%) and $H_2O$ (65.8%) concentrations. Calculated gas emissivity and net radiative heat flux to the checker surface was 0.187 and 1421 w/m², respectively. As seen in Table 1, the net radiative heat flux received by the oxy flue (Case 2) is 2.03 times of that of the air flue (Case 1). The higher net heat flux of Case 2 can be attributed to the higher concentrations of $CO_2$ and $H_2O$ in the flue.

Cases 1 and 2 are shown here for reference, to illustrate the superior unexpected results obtained with the present invention as exemplified in Cases 3, 4 and 5.

Cases 3, 4 and 5 simulate checker to gas radiative heat transfers under an assumed reforming condition during thermal chemical reforming. Syngas compositions in checker passages were assumed to have 6% $CO_2$, 30% $H_2O$, 2% $CH_4$, 40% $H_2$, and 22% CO for all the three cases. In Case 3, it was presumed that the syngas contained no soot. Calculated syngas emissivity was 0.143 and a net heat flux of 1086 w/m² was obtained, which was unexpectedly lower than 1421 w/m² of the oxy flue heat transfer of Case 2. The lower net heat flux of Case 3 when compared to that of Case 2 was due to lower concentrations of participating radiative species (total of $CO_2$, CO, $CH_4$, and $H_2O$). As described in previous sections of this disclosure of the invention, the lower gas emissivity of Case 3 is the result of thermal chemical reforming which depleted $CO_2$ and $H_2O$ gases and generated a large amount of $H_2$ gas and the hydrogen gas does not participate in nor contribute to the checker-to-gas radiation heat transfer.

To enhance heat transfer during thermal chemical heat recovery process, the reforming cycle was operated under preferred conditions such that a portion of the reforming fuel generated soot. As listed in Table 1, syngas compositions for Cases 4 and 5 were kept the same as those of Case 3, except that different amount of soot concentrations were introduced. For explaining purpose, soot concentrations for the two cases were set at 1 g/m³ for Case 4 and 2 g/m³ for Case 5. In Case 4, the calculated total emissivity for the gas/soot mixture was 0.345 which is significantly higher than that of the syngas without soot (Case 3) and the oxy-flue example (Case 2). This higher emissivity contributed to the higher heat flux (2621 w/m²) received by the syngas. As seen in Case 5 when 2 g/m³ of soot were formed during reforming, emissivity of the gas/soot mixture increased to 0.489. The corresponding net heat flux received by the syngas was 3715 w/m² which is 5.31 times higher than that of the reference case (Case 1).

In summary, this example has demonstrated clearly the effectiveness of generating in-situ soot during the thermochemical heat recovery process, for the purpose of enhancing overall checker-to-gas heat transfer rates which in turn improves waste heat recovery efficiency.

| Gas composition: | Case 1 Air-fired flue gas | Case 2 Oxy-fired flue gas | Case 3 Syngas without soot | Case 4 Syngas with less soot | Case 5 Syngas with more soot |
|---|---|---|---|---|---|
| $CO_2$ (%) | 9.1 | 32.9 | 6 | 6 | 6 |
| $H_2O$ (%) | 18.2 | 65.8 | 30 | 30 | 30 |
| $O_2$ (%) | 1 | 1.3 | 0 | 0 | 0 |
| $CH_4$ (%) | 0 | 0 | 2 | 2 | 2 |
| $H_2$ (%) | 0 | 0 | 40 | 40 | 40 |
| CO (%) | 0 | 0 | 22 | 22 | 22 |
| Soot (g/m³) | 0 | 0 | 0 | 1 | 2 |
| Gas temperature (C.) | 1120 | 1120 | 1120 | 1120 | 1120 |
| Gas pressure (atm) | 1 | 1 | 1 | 1 | 1 |
| Mean beam length (m) | 0.14 | 0.14 | 0.14 | 0.14 | 0.14 |
| Gas or Mixture emissivity | 0.092 | 0.187 | 0.143 | 0.345 | 0.489 |
| Checker temperature, (C.) | 1150 | 1150 | 1150 | 1150 | 1150 |
| Checker emissivity | 0.4 | 0.4 | 0.4 | 0.4 | 0.4 |
| Net heat flux by thermal radiation (w/m²) | 699 | 1421 | 1086 | 2621 | 3715 |
| Ratio of net heat flux | 1 | 2.03 | 1.55 | 3.75 | 5.31 |

What is claimed is:

1. A method of carrying out combustion in a furnace, comprising
   (A) combusting fuel in a furnace to produce gaseous combustion products, and
   (B) alternately (1) (i) passing gaseous combustion products from the furnace into and through a cooled first regenerator to heat the first regenerator and cool said gaseous combustion products,
   (ii) passing at least a portion of said cooled portion of gaseous combustion products from said first regenerator, and hydrocarbon fuel, into a heated second regenerator,
   (iii) reacting the gaseous combustion products and the fuel in the second regenerator in an endothermic reaction under conditions effective to form a mixture of syngas comprising hydrogen, carbon monoxide, and soot which is entrained in the syngas, wherein the mixture contains 0.1 to 20 grams of soot per cubic meter of the mixture, and thereby cooling the second regenerator; and
   (iv) passing said syngas and entrained soot from said second regenerator into said furnace and combusting the syngas and entrained soot in the furnace with one or more oxidant streams injected into said furnace; and
   (2) (i) passing a portion of the gaseous combustion products from the furnace into and through a cooled second regenerator to heat the second regenerator and cool said portion of the gaseous combustion products,
   (ii) passing at least a portion of said cooled portion of gaseous combustion products from said second regenerator, and hydrocarbon fuel, into a heated first regenerator,
   (iii) reacting the gaseous combustion products and the fuel in the first regenerator in an endothermic reaction under conditions effective to form to form a mixture of syngas comprising hydrogen, carbon monoxide, and soot which is entrained in the syngas, wherein the mixture contains 0.1 to 20 grams of soot per cubic meter of the mixture, and thereby cooling the first regenerator, and
   (iv) passing said syngas and entrained soot from said first regenerator into said furnace and combusting the syngas and entrained soot in the furnace with one or more oxidant streams injected into said furnace;
   wherein said hydrocarbon fuel is natural gas and the molar ratio of the portion of said cooled portion of gaseous combustion products from said first regenerator passed into a heated second regenerator and said hydrocarbon fuel is less than 0.5:1.

2. The method of claim 1 wherein the furnace contains material that contains fine particulate matter or material that upon being heated in the furnace produces fine particulate matter by decrepitation, and the combustion of the syngas and entrained soot in the furnace accelerates the formation of a glassy layer on said material which thereby reduces the fine particulate matter from being entrained into gaseous combustion products in the furnace.

3. The method of claim 1 further comprising adding to (a) the cooled portion of gaseous combustion products, and hydrocarbon fuel, which is passed into the heated second regenerator, or to (b) the cooled portion of gaseous combustion products, and hydrocarbon fuel, which is passed into the heated first regenerator, or to both (a) and (b), additional material which forms soot in said heated regenerator.

4. The method of claim 1 further comprising adding soot to (a) the cooled portion of gaseous combustion products, and hydrocarbon fuel, which is passed into the heated second regenerator, or to (b) the cooled portion of gaseous combustion products, and hydrocarbon fuel, which is passed into the heated first regenerator, or to both (a) and (b).

5. The method of claim 1 wherein said cooled portion of gaseous combustion products from said first regenerator passed into a heated second regenerator contains more than 0.1 g per Nm3 of particulates and enhances radiative heat transfer in said second regenerator.

6. The method of claim 1 wherein the gaseous combustion products passed from the furnace into the cooled first regenerator and the gaseous combustion products passed from the furnace into the cooled second regenerator contain no soot.

\* \* \* \* \*